Nov. 8, 1932.  E. H. ADAMS  1,887,111

GAS TRAP

Filed Dec. 10, 1930   2 Sheets-Sheet 1

Nov. 8, 1932.  E. H. ADAMS  1,887,111
GAS TRAP
Filed Dec. 10, 1930   2 Sheets-Sheet 2
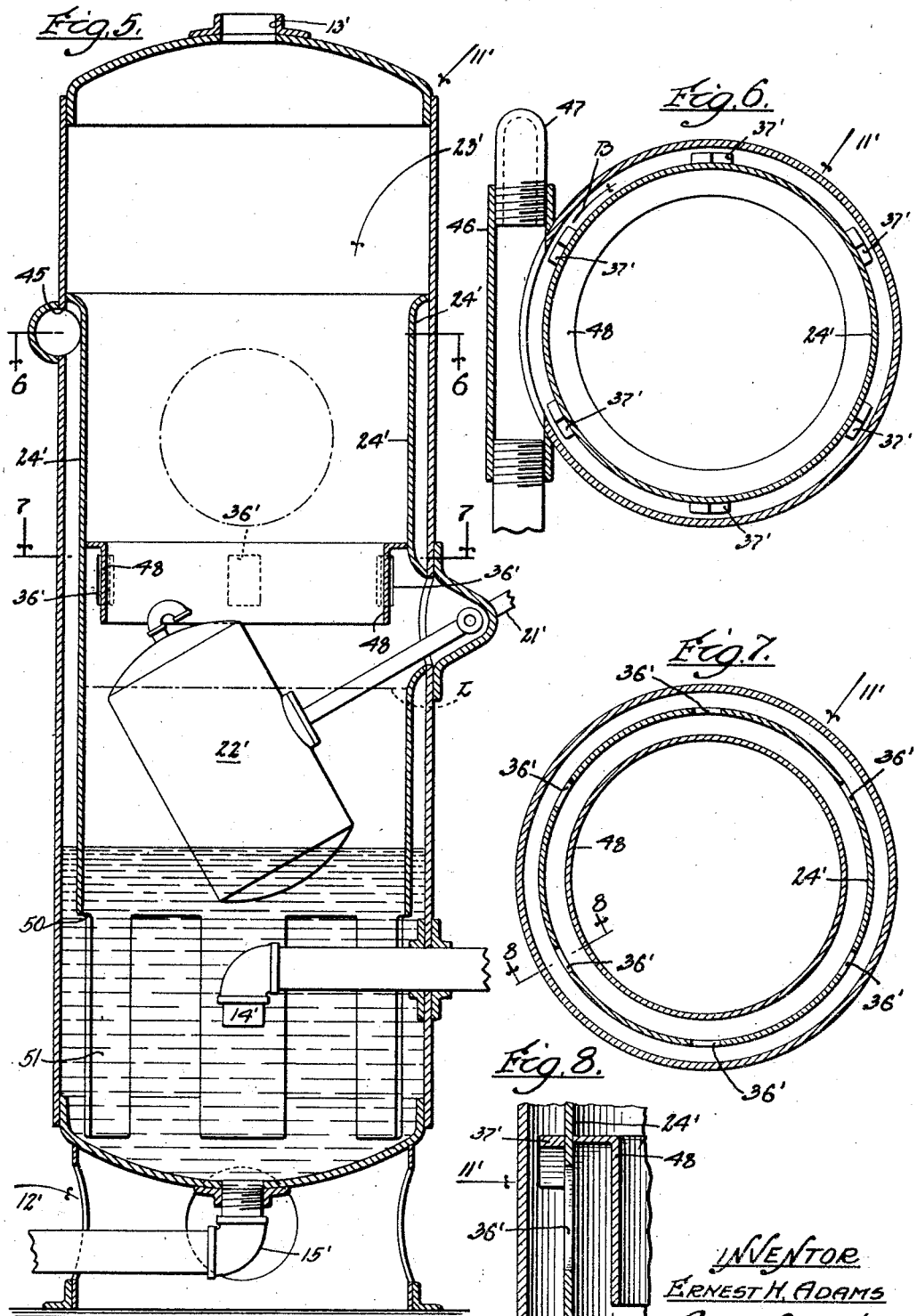

Patented Nov. 8, 1932

1,887,111

UNITED STATES PATENT OFFICE

ERNEST H. ADAMS, OF LONG BEACH, CALIFORNIA, ASSIGNOR TO TRUMBLE GAS TRAP COMPANY, A COPARTNERSHIP CONSISTING OF FRANCIS M. TOWNSEND, A. J. GUTZLER, AND MILON J. TRUMBLE

GAS TRAP

Application filed December 10, 1930. Serial No. 501,255.

This invention has to do with the art of separating liquids and gases, and it is more particularly related to gas oil separators or gas traps and scrubbers such as are commonly used in the production of petroleum for the separation of natural gas from crude oil as it is being delivered from the well.

It has been found in the design and operation of gas traps of the class described above that the most efficient separation of the gas and oil is obtained in the traps which are constructed so that the oil is spread out as a thin film on the inner surface of the shell forming the trap, thus minimizing the resistance offered by the oil to the escape of the gas bubbles from the oil.

The general construction of the usual type of gas traps, such as are in common use in the oil fields, comprises a shell which is provided with an oil gas inlet, and has a gas outlet in its upper end portion and an oil outlet in the lower end portion, the two outlets being provided with valves which are controlled by means of a float contained within the shell for maintaining a predetermined oil level in the shell. These shells are usually provided with some form of baffle or distributing ring which is associated with the oil gas inlet in a manner such that the oil is directed downwardly across the inner surface of the shell, the purpose of such baffle being to cause the oil to spread out in a thin film on the shell wall.

The shell may be broadly described as forming or enclosing a settling chamber, and while the majority of the oil contained in the oil-gas mixture is in a form such that it will flow downwardly across the wall of the settling chamber, a certain amount of the oil is always in the form of mist, and the initial movement of the gas toward the gas outlet, as it enters the shell, tends to carry this latter oil with it, thus reducing the separating efficiency of the unit.

Various attempts have been made to remove this mist from the gas, such as the provision of auxiliary conelike baffles in the shell around which the gas must pass before it reaches the gas outlet.

One object of the present invention is to provide a gas oil separator wherein all of the oil contained in the gas oil mixture is brought into contact with vertical surfaces so that it has an opportunity to collect in a film and flow downwardly over such surfaces, thus effecting a complete separation of the oil from the gas. As pointed out above, the efficiency of separators of the class described is dependent largely upon the extent to which the oil is spread out in a film for releasing the gas, and it is a further object of this invention to produce a separator which has a maximum spreading surface for the oil.

The general construction of the device contemplated by this invention embodies a shell which forms or encloses a settling chamber and is associated with a separating chamber that surrounds the settling chamber and is in internal communication with the settling chamber at its lower end portion. The oil gas mixture is delivered into the upper end of the separating chamber where it passes downwardly between the two walls defining the separating chamber, and these walls are placed in close proximity with each other so that substantially all of the oil contained in the oil gas mixture contacts with one wall or the other. During the downward movement of the oil gas mixture in the separating chamber, the oil collects in a thin film on the walls of the separating chamber, and the gas travels downwardly through the central portion of this chamber. Means are provided in the lower end portion of the inner wall of the separating chamber for delivering the gas into the central settling chamber, and such means include a baffle or a system of baffles arranged so as to direct the gas or gas oil mixture into engagement with the inner surface of a skirt which forms an inner wall encircling a part of the settling chamber. I consider it a feature of this invention to arrange these baffles so that the gas must be turned from its course in the separating chamber before entering the settling chamber.

The settling chamber is provided with a gas outlet and an oil outlet, such outlets being provided with valves which are controlled by a float of the usual type for the purpose of maintaining a predetermined oil level in the settling chamber.

When the device contemplated by this invention is used as a gas trap in connection with mixtures having a high ratio of oil to gas, the float and its associated valves are preferably adjusted so that the oil level is maintained above the lower edge of the skirt which forms the separating chamber. In connection with scrubbers, however, where the oil-gas ratio is very low, it is not so essential that the oil level be maintained above the lower edge of the skirt.

I consider it a further object of this invention to provide an annular horizontal baffle below the lower edge of the separating chamber in the gas traps for the purpose of directing the oil flowing downwardly therefrom across the upper surface of the quiescent body of oil in the bottom of the settling chamber. In this construction, any gas contained in the oil after it reaches the bottom of the separating chamber is released as this oil travels outwardly over the upper surface of the main body of the oil in the bottom of the settling chamber.

I consider it a further object of this invention to provide a gas trap of the class described with an annular distributing ring or distributing chamber which is situated at the upper end of the separating chamber, and which may be provided with an auxiliary reservoir associated with the oil gas inlet so as to form a liquid cushion for the incoming fluid.

The details in the construction of my invention together with other objects attending its production, will be best understood from the accompanying drawings, which are chosen for illustrative purposes only, and in which—

Fig. 1 is a sectional elevation showing a preferred form of my invention;

Fig. 2 is a sectional view taken in a plane represented by the line 2—2 in Fig. 1;

Fig. 3 is an enlarged partial plan section taken in a plane represented by the line 3—3 in Fig. 1;

Fig. 4 is an elevational view which may be considered as having been taken in a plane represented by the line 4—4 in Fig. 3;

Fig. 5 is a sectional elevation similar to Fig. 1, but showing a modified form of my invention;

Fig. 6 is a sectional view taken in a plane represented by the line 6—6 in Fig. 5;

Fig. 7 is a plan section taken in a plane represented by the line 7—7 in Fig. 5; and Fig. 8 is an enlarged sectional elevation taken in a plane represented by the line 8—8 in Fig. 7.

More particularly describing the invention as herein illustrated, reference numeral 11 indicates a shell which is shown as being supported by a stand 12, and has a gas outlet 13 provided in its upper end portion, and an oil outlet 14 provided in its lower end portion. The shell is also provided with a drain 15 which may be used from time to time in cleaning the shell.

Reference numeral 16 indicates a valve unit which may be of any well known construction employed in devices of this character, but is preferably of the type shown and described in the co-pending application of William McGraw and Richard Woodward, Serial No. 93,840, filed March 11, 1926. This valve unit is provided with an oil inlet 17, a gas inlet 18, an oil outlet 19, and a gas outlet 20, and is associated through the medium of a link and lever system 21 with a float 22 which cooperates with the valve unit to prevent the oil "O" rising above a predetermined maximum level.

The interior of the shell 11 will be generally referred to later in the specification and in the claims as comprising a settling chamber 23.

Reference numeral 24 indicates a skirt which is mounted within the shell 11 in concentric relation therewith, and is spaced inwardly therefrom so as to form an annular separating chamber 25 which surrounds a portion of the settling chamber 23. The separating chamber 25 has provided at its upper end portion an annular distributing chamber 26 shown as being formed by a substantially U-shaped ring 27 which is welded or otherwise attached to the interior of the shell 11.

Reference numeral 28 indicates a gas oil inlet through which a mixture of gas and oil coming from a well is directed into a distributing chamber 26, and it will be noted that the distributing chamber communicates with the separating chamber through an annular opening 29.

For the purpose of providing a liquid cushion to receive the initial impact of the incoming oil and gas, so as to reduce the wear upon the interior of the distributing chamber which might be caused by sand contained within the gas oil mixture, I provide what may be termed an auxiliary reservoir which is shown as being in the form of a bull plug or bull nipple 31 which is mounted in coaxial relation with the oil gas inlet 28. The distributing chamber may also be provided with a reinforcing or wear plate indicated by reference numeral 32.

Reference numeral 33 indicates an annular horizontal baffle ring which is shown as being positioned a substantial distance below the oil level L, and is arranged for the purpose of directing the oil coming from the separating chamber inwardly toward the central portion of the body of oil in the settling chamber and across the top of such body. In this manner, any gas contained in the oil after it reaches the bottom of the settling chamber is immediately released, due to its proximity to the surface of such body. It will be noted that the lower end of the skirt 24 is positioned a slight distance above the annular baffle 23, and it is a feature of this form of my invention that the discharge of the gas and oil from the settling chamber is controlled so as to maintain the lower oil level L' above the bottom of the skirt, as indicated in the drawings. It will thus be apparent that the oil flowing downwardly on both of the surfaces which define the separating chamber 25 must enter the settling chamber through the main body of oil indicated at O.

The gas released in the separating chamber 25 is delivered into the settling chamber 23, through a plurality of ports 36 positioned so as to be above the maximum oil level in the shell. In order that the oil flowing downwardly on the outer surface of the skirt 24 will be directed away from the ports 36, I provide a series of angular baffles 37 within the separating chamber and above the ports 36. These baffles are preferably attached, by welding or otherwise, directly to the outer surface of the skirt.

It was pointed out above that the separation of the gas from the oil is aided by bringing the gas or the vapors into contact with a surface of the separator, and it was also mentioned as one of the objects of this invention to provide a gas trap which had a maximum surface area for contacting the vapors or oil and gas mixture. As a further means of accomplishing this object, I have provided the gas delivery ports 36 with directing plates or directing baffles 38. The baffles 38 are attached directly to the interior surface of the shell 24, adjacent the ports 36, and are formed so as to direct the gas or vapors coming from the separating chamber in the general direction of the arrow A so that they not only engage the inner surface of the baffle 38, but are directed tangentially across the inner surface of the shell 24.

In the operation of the gas trap contemplated by this invention, the gas oil mixture follows the general direction of the arrows shown in Figs. 1 and 2. When the mixture initially enters the distributing chamber 26, it is divided into two streams which flow in substantially opposed directions downwardly through the separating chamber 25 on opposite sides of the gas oil inlet, and it will be noted from Fig. 2 that the baffle plates or directing plates 38 are arranged in sets on opposite sides of the center line defined by the gas oil inlet, the individual baffles in these two sets being positioned in opposed relation with each other so that the discharged gas oil mixture is turned from the general course initially imparted to it when it enters the separating chamber.

The course of the gas-oil mixture as it enters the settling chamber from the separating chamber is clearly illustrated by the arrows in Fig. 3 where it will be noted that the stream of gas must turn from its general annular course before it can leave the separating chamber. Since the movement of the gas oil stream is downward as well as centrifugal, it will be seen that the heavier oil particles suspended in the gas will be thrown down into the main oil body as the gas is drawn from the separating chamber through the ports due to the differential pressure between the two chambers. The baffles 38, therefore, have a dual function. First they reverse the gas stream so that the heavier oil particles are precipitated in the separating chamber and then they direct the stream of gas so that it sweeps tangentially across the inner surface of the shell where a quantity of the finely divided oil in suspension is deposited in drops on the metal surface and flows down into the body of oil O. The baffle plates 38 are in the form of flat hoods closed on the top and one side so that the gas must flow downward and tangentially therefrom.

Reference numeral 40 indicates a manhole of the usual type provided in gas traps of this nature, and it will be noted that the skirt 24 is flared out above the manhole, as indicated at 41, so that access may be had to the interior of the settling chamber through this manhole.

Figs. 5 to 9 inclusive show a modified form of my invention in which parts similar to those described in Figs. 1 to 4 inclusive, are indicated by the same reference numeral distinguished by the prime mark. This form of my invention is illustrated in connection with a scrubber and differs from the form shown in Figs. 1 to 4 inclusive in the manner of introducing the gas oil mixture into the separating chamber, and the baffle means associated with the ports through which the gas is delivered from the separating chamber into the settling chamber.

It will be noted from Figs. 5 and 6 that the shell 11' is not provided with a distributing chamber as shown in Fig. 1, but the skirt 24' is attached directly to the interior of the shell above the point 45 at which the gas oil mixture enters the separating chamber.

The manner of delivering the gas oil mixture into the separating chamber differs from that shown in Fig. 1 in that the gas oil delivery pipe 46 is arranged tangentially with respect to the shell 11'. This pipe is provided with a bull nipple 47 to form a cushion for the incoming fluid, and the fluid is directed through the tangential pipe in the general direction of the arrow B so that it flows spirally about a shell 24'.

Instead of providing the gas inlet ports 36' with individual baffles, I provide a single annular baffle plate 48 which is attached to the interior of the shell and directs the incoming vapors downwardly in the general direction of the arrow B so that they flow across the inner wall of the shell 24' before being admitted to the settling chamber.

The scrubber 11' is not provided with an annular baffle ring, and as pointed out above, the lower oil level may at times fall below the lower edges of the skirt 24' which is defined by the upper edges 50 of the supporting legs 51.

It will be apparent from the foregoing description that the device contemplated by this invention is of simple form and construction, and that it is constructed so that the maximum amount of surface is exposed to the gas oil mixture during its separation.

It will be understood that while I have herein described and illustrated certain preferred embodiments of my invention, the invention is not limited to the precise construction described above, but includes within its scope whatever changes fairly come within the spirit of the appended claims.

I claim as my invention:

1. An oil gas separator embodying: an outer shell forming a settling chamber; a skirt forming with said shell an annular separating chamber; means for delivering an oil gas mixture into said separating chamber; means for controllably discharging oil and gas from said settling chamber so as to maintain a body of oil in said settling chamber which extends above the lower edge of said skirt; and a baffle ring on the inner surface of said shell below the lower edge of said skirt for directing oil from said separating chamber across the top of the body of oil in said settling chamber.

2. An oil gas separator embodying: an outer shell forming a settling chamber; a skirt within said shell forming with said shell an annular separating chamber; means for delivering an oil gas mixture into said separating chamber; means for controllably discharging oil and gas from said settling chamber so as to maintain a body of oil in said settling chamber which extends above the lower edge of said skirt; a substantially horizontal baffle ring on the inner surface of said shell below the lower edge of said skirt for directing oil from said separating chamber across the top of the body of oil in said settling chamber, said skirt having ports provided in an intermediate portion thereof for admitting gas from said separating chamber into said settling chamber; and baffle members within said separating chamber for directing oil on the outer surface of said skirt away from said ports.

3. An oil gas separator embodying: an outer shell forming a settling chamber; an oil gas inlet in said shell near the upper end thereof; an annular distributing ring mounted in said shell adjacent the inlet opening, the bottom of said ring having an arcuate outlet slot which is closed in the region immediately below the inlet; a skirt mounted in said shell below said ring with its lower edge substantially above the bottom of said shell so as to provide a narrow annular settling chamber adapted to receive the mixture leaving said slot; a substantially horizontal baffle ring mounted in said shell below the lower edge of said skirt; a gas outlet in the top of said shell; an oil outlet in the bottom portion of said shell; means for maintaining the oil level above the lower edge of said skirt, said skirt having ports therein above the oil level in said shell; angular baffle hoods mounted in said separating chamber above said ports; and baffle lips mounted on the inner surface of said shell opposite said ports.

4. An oil gas separator embodying: an outer shell forming a settling chamber; an oil gas inlet in said shell near the upper end thereof; an annular distributing ring mounted in said shell adjacent the inlet opening, the bottom of said ring having an arcuate outlet slot which is closed in the region immediately below the inlet; a skirt mounted in said shell below said ring with its lower edge substantially above the bottom of said shell so as to provide a narrow annular settling chamber adapted to receive the mixture leaving said slot; a substantially horizontal baffle ring mounted in said shell below the lower edge of said skirt; a gas outlet in the top of said shell; an oil outlet in the bottom portion of said shell; means for maintaining the oil level above the lower edge of said skirt; said skirt having ports therein above the oil level in said shell; angular baffle hoods mounted in said separating chamber above said ports; and baffle lips mounted on the inner surface of said shell opposite said ports, said baffle lips being open at the lower edges and having closures adapted to reverse the direction of flow of said gas.

In testimony whereof, I have hereunto set my hand at Los Angeles, California, this 2nd day of December, 1930.

ERNEST H. ADAMS.